July 12, 1960  G. A. LE BLANC  2,944,742
HOSE NOZZLE WITH PLASTIC TIP AND FLIP RING
Filed Jan. 10, 1958
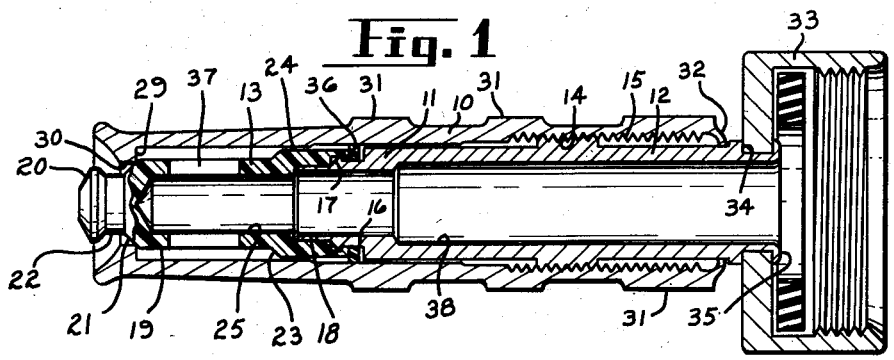
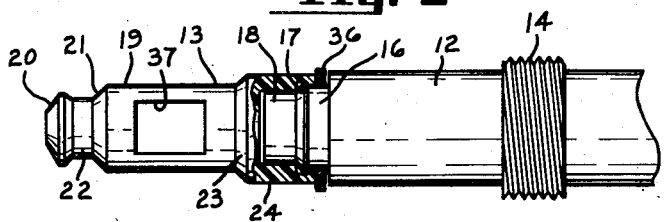
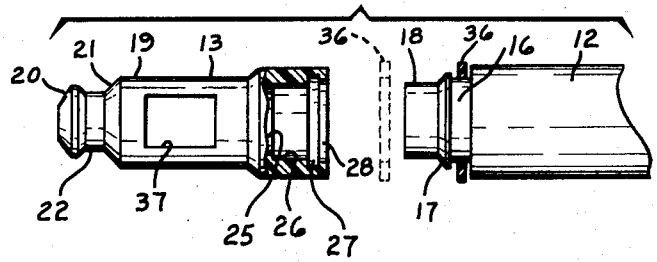
INVENTOR
Gerald A. Le Blanc
BY
H. F. Johnston
ATTORNEY

2,944,742
HOSE NOZZLE WITH PLASTIC TIP AND FLIP RING

Gerald A. Le Blanc, Waterbury, Conn., assignor, by mesne assignments, to Otto Bernz Company, Inc., Rochester, N.Y., a corporation of New York Filed Jan. 10, 1958, Ser. No. 708,283

1 Claim. (Cl. 239—458)

My invention relates to hose nozzles and especially to nozzles of the type used with garden hose.

The purpose of the invention is to provide a nozzle of novel construction which will have various advantages from the standpoint of utility and economy of manufacture. These advantages have been attempted in other nozzles but not successfully combined in any single construction.

For example, it is desirable that the valve end of the stem be able to flex slightly with respect to the threaded portion of the stem so that it may accommodate itself to a discharge orifice which may be slightly off-center. A valve end of plastic material, such as polyethylene, will permit this function but there are disadvantages if the entire stem is made from such a plastic.

Also, it is desirable to have a sealing ring between the valve end and the threaded part of the stem and in practice, this has been done. However, it has been necessary to stretch the rings upon a thimble from which they must be moved into the groove in the nozzle stem. In the use of so-called flip rings, which are rubber rings of rectangular cross-section and more economical than other types of rings, the above method of assembly often resulted in the ring being inverted or twisted with the result that the nozzle would leak over the stem.

According to my invention, the stem is made of two pieces with the valve end of pliable plastic material and the threaded part of metal. The construction is such that the flip ring may be readily assembled on a reduced end of the metal stem and the plastic valve-end piece easily snapped into position on such reduced end with the sealing ring confined with the proper clearance between the plastic part and the adjacent shoulder on the metal part.

In the accompanying drawings, I have shown for purpose of illustration, one embodiment which my invention may assume in practice.

In these drawings:

Fig. 1 is a longitudinal section of my hose nozzle.

Fig. 2 is a side view of the two-piece stem in an assembled state with a portion of the stem in section.

Fig. 3 is a side view of the two-piece stem before assembly with a portion of the forward end piece in section.

The embodiment of the hose nozzle shown consists of an outer sleeve 10 with which is threadedly fitted a hollow stem 11 in the usual manner. The stem consists of two parts, a base piece 12 and a forward extension or valve-end piece 13. The base piece 12 is provided with a relatively short external thread 14 which engages with a relatively long internally threaded portion 15 of the outer sleeve 10. Since the threaded body or base piece 12 is of metal, there is provided a reliable and easily operable means to move the stem 11 relative to the sleeve 10. The forward end of the stem base piece 12 is of reduced diameter and has an annular groove 16 between a rib 17 and the shoulder at the juncture of the reduced diameter end with the main body of the stem base piece 12. The extreme end section 18 adjoining the rib 17 may be of still smaller diameter for reasons that will appear later. Positioned in the groove 16 is a flip ring 36 of rectangular construction to provide a leak-proof seal between the stem 11 and sleeve 10. The forward stem piece 13 is made of plastic which is of a somewhat pliable nature, such as polyethylene, and consists of a barrel portion 19, the forward valve end of which is joined to the usual tip end 20 by means of the beveled surface 21 and reduced neck 22. The beveled surface 21 is adapted to seat in the discharge opening 30 in the outer sleeve when shutting off the nozzle.

Connetced to the rear of the barrel portion 19 by means of a beveled surface 23 is an enlarged portion 24, the outside diameter of which is substantially the same as the outside diameter of the base piece 12. The forward piece 13 has an internal passage 25 which connects to an enlarged bore 26 adjacent its open end. Within the bore 26 of the enlarged portion 24 there is formed an annular groove 27 and an inturned lip 28. The dimensions of the parts are such that the plastic forward piece 13 fits tightly around the reduced end 18 of the metal base piece 12 with the rib 17 engaging in the groove 27 to hold the parts in such relation that the ring 36 is confined between the plastic piece and the adjacent shoulder of the metal piece with just enough clearance to permit the ring to function efficiently as a seal. The ports 37 in the forward plastic piece provide communication between the passage 25 and the space around the forward end of the stem to conduct water to the discharge opening.

The sleeve 10 has at its forward end a shoulder 29 and a reduced opening 30 which will permit passage of the tip end 20 but not the barrel portion 19 of the stem 11. The outside surface of the sleeve 10 is provided with knurled portions 31 to provide a gripping surface and the rearward end has an inturned lip 32 that will engage the threaded portion 14 to prevent removal of the stem 11 from the sleeve 10. To the base end of the stem 11 is rotatably connected the usual coupling nut 33 by means of the shoulder 34 and flared flange 35.

To assemble the two-part stem 11 is a very simple matter. First, the flip ring 36 is slipped over the rib 17 and into the annular groove 16. The rib 17 is only slightly larger than the inside diameter of the flip ring 36 and has the beveled forward face so that no undue or excessive stretching or distortion of the ring is necessary. Also, the rib 17 is relatively narrow so there is no twisting of said flip ring thus assuring an assembly with a ring in good condition. The annular groove 16 is wide enough to permit visual inspection of the flip ring before further assembly. Next, the plastic valve-end piece 13 is attached to the base section 12 in the following manner: The reduced end portion 18 of the base section 12 is fitted into the enlarged bore 26 of the forward section 13 thereby causing the inturned lip 28 to contact the tapered portion of the rib 17. Because of the resilient nature of the plastic material, pressing the forward section 13 and base section 12 together longitudinally will cause the inturned lip 28 to ride up the tapered portion of the rib 17 and snap over said rib into the annular groove 16, thus positioning the rib 17 in the annular groove 27 and the reduced portion 18 in the bore 26. When thus assembled, the bore 25 in the valve-end piece will connect with the bore 38 in the base piece 12.

It should now be noted that the forward section 13 and base piece 12 are permanently attached to each other. If desired, the connection is loose enough to permit the forward section 13 to wobble slightly in relation to the base piece 12, but normally the pliability of the hollow barrel part of the forward piece will allow the tapered section 21 to seat tightly against the shoulder 29 of the opening 30 even though the opening 30 may be a little off-center due to manufacturing tolerance.

What I claim:

A nozzle adapted for attachment to a hose comprising a hollow outer sleeve having a discharge opening at one end, a hollow stem including a metal cylindrical body portion having threaded engagement with the outer sleeve and a reduced end section providing a shoulder between such end portion and the body of the stem, and an extension of pliable plastic material having an open end surrounding said reduced end of the metal stem and an internal annular groove adjacent said open end, a narrow annular rib around said reduced end of the metal stem engaging with said internal annular groove to hold said plastic piece in fixed position with respect to said shoulder so as to provide an exterior annular groove between the open end of the plastic piece and said shoulder, said rib being substantially of smaller diameter than the body portion of the metal stem member and having a beveled forward face, and a sealing member of the flip ring type seated in said exterior annular groove, said plastic extension piece having a passageway communicating with interior of the metal stem member and opening through ports to a space between the plastic extension and outer sleeve, the end portion of said plastic extension being shaped to provide a valve for controlling said discharge opening in the outer sleeve.

References Cited in the file of this patent

UNITED STATES PATENTS

| | | |
|---|---|---|
| 2,315,225 | Rogers | Mar. 30, 1943 |
| 2,783,094 | Storie | Feb. 26, 1957 |